Patented Sept. 8, 1925.

1,553,271

UNITED STATES PATENT OFFICE.

HORACE A. SHONLE AND PERRY Q. ROW, OF INDIANAPOLIS, INDIANA, ASSIGNORS TO ELI LILLY & COMPANY, OF INDIANAPOLIS, INDIANA, A CORPORATION OF INDIANA.

BENZYL ESTERS OF THE HIGHER FATTY ACIDS.

No Drawing.     Application filed May 6, 1920. Serial No. 379,400.

*To all whom it may concern:*

Be it known that we, HORACE A. SHONLE and PERRY Q. ROW, citizens of the United States, residing at Indianapolis, in the county of Marion and State of Indiana, have invented certain new and useful Improvements in Benzyl Esters of the Higher Fatty Acids, of which the following is a specification.

Our invention relates to the benzyl esters of the higher fatty acids which are valuable as therapeutic agents and are superior to the previously known benzyl esters in that they are free from irritating properties and also from unpleasant odor or taste. By higher fatty acids, we mean all fatty acids containing ten or more carbon atoms of which lauric, capric, palmitic, stearic, oleic and linolic acids are examples. For therapeutic purposes the benzyl esters of the higher fatty acids may be used in the pure form or mixed with varying amounts of the fatty acids from which they are prepared. The presence of a small amount of free fatty acids in the benzyl esters is unobjectionable from a therapeutic standpoint. It is therefore advantageous to allow a small amount, for example 5% or 10%, of the free fatty acids to remain mixed with the benzyl esters in the final product as this greatly decreases the cost of preparation. For therapeutic purposes it is advantageous, owing to the lower cost, to use mixed fatty acids, derived from naturally occurring materials such as oils, fats or waxes, for the preparation of the mixed benzyl esters.

The benzyl esters of the higher fatty acids have a lower specific gravity than water and when pure, are tasteless and odorless. They are readily saponified by alkalies, forming benzyl alcohol and the corresponding fatty acid or acids. They are insoluble in water but readily soluble in ether, chloroform and benzene and somewhat less soluble in alcohol, ethyl acetate, olive oil and petroleum oils. They possess the general structure $R-COO-CH_2-C_6H_5$ in which R represents any alkyl group, containing 9 or more carbon atoms.

The benzyl esters of the higher fatty acids may be prepared by converting the acids into the corresponding benzyl esters by the usual methods of esterification. They are advantageously prepared according to the following method:

Benzyl chloride is allowed to react with the anhydrous alkali salt of the fatty acid suspended or dissolved in a suitable solvent such as the acid, of which the ester is being prepared. The benzyl chloride, slightly in excess of one molecular proportion, is heated with one molecular proportion of the anhydrous alkali salt, dissolved or suspended in an excess of the acid, until the reaction is completed. If it is desired to use a mixture of the higher fatty acids naturally occurring in an oil, fat or wax, the oil, fat or wax is saponified and the fatty acids separated by any of the usual methods. The anhydrous alkali salts of the mixed fatty acids are dissolved or suspended in an excess of the same mixture of fatty acids and the mixed benzyl esters prepared by the method above described.

A specific example of the method for preparing a benzyl ester of a higher fatty acid is shown by the following method for the preparation of benzyl stearate.

One hundred parts by weight of stearic acid are heated to from 150°–170° C. and 9.4 parts by weight of anhydrous sodium carbonate are gradually added. When this reaction is completed, 22.2 parts by weight of benzyl chloride are added and the mixture is then heated under a reflux condenser at 170°–180° C. until the reaction is completed. At this stage of the process about one-half of the stearic acid has been esterified. The process is continued by adding 4.7 parts by weight of anhydrous sodium carbonate to the mixture and when this reaction is completed, 11.1 parts by weight of benzyl chloride are added and the mixture heated as before. At this stage of the process about 75% of the stearic acid has been esterified. If it is desired to esterify a larger proportion of the stearic acid, the process may be continued by adding further quantities of sodium carbonate and benzyl chloride reducing the amounts each time to one-half of that added in the step immediately preceding. When the desired amount of the stearic acid has been esterified, the sodium chloride is removed from the resulting mixture of benzyl stearate and stearic acid by washing with water and any slight excess of benzyl chloride is removed by steam distillation. The benzyl stearate is separated from the stearic acid by crystallization from alcohol.

The reaction between benzyl chloride and sodium stearate is expressed by the following equation:

The properties of pure benzyl stearate prepared by the above process are as follows:

It is a white crystalline solid melting at 45.8° C. and having a specific gravity of 0.9075 at 50° C. It is insoluble in water but readily soluble in ether, chloroform and benzene and somewhat less soluble in alcohol, ethyl acetate, olive oil and petroleum oils. It is readily saponified by alkali to stearic acid and benzyl alcohol, yielding about 29% of benzyl alcohol.

Having thus fully described our said invention, what we claim as new and desire to secure by Letters Patent, is:

1. The benzyl esters of the higher fatty acids.
2. The benzyl esters of the fatty acids containing ten (10) or more carbon atoms.
3. The mixed benzyl esters of the higher fatty acids derived from naturally occurring fatty acid containing materials.
4. The mixed benzyl esters of the higher fatty acids naturally occurring in oils, fats and waxes.
5. The mixed benzyl esters of higher fatty acids derived from fats, oils and waxes.
6. The mixed benzyl esters of higher fatty acids derived from waxes.
7. A benzyl ester of a higher fatty acid with an excess of the corresponding fatty acid.
8. The benzyl esters of fatty acids containing ten (10) or more carbon atoms, with an excess of the corresponding acid.
9. The mixed benzyl esters of higher fatty acids, naturally occurring in fats, oils and waxes with an excess of the corresponding mixture of acids.
10. The mixed benzyl esters of higher fatty acids, naturally occurring in waxes with an excess of the corresponding mixture of acids.
11. The mixed benzyl esters of higher fatty acids derived from naturally occurring fatty acid containing materials, with an excess of the corresponding mixture of acids.
12. The mixed benzyl esters of higher fatty acids derived from fats, oils and waxes, with an excess of the corresponding mixture of acids.
13. The benzyl ester of stearic acid.
14. The benzyl ester of stearic acid with an excess of stearic acid.
15. The process of preparing the benzyl esters of the higher fatty acids which consists in treating the anhydrous alkali salt of the acid with benzyl chloride.
16. The process of preparing the benzyl esters of the higher fatty acids which consists in treating the anhydrous alkali salt of the acid with benzyl chloride, freeing the resulting product from any excess of benzyl chloride by steam distillation, and separating the ester from any excess of fatty acid.
17. The process of preparing the benzyl ester of stearic acid which consists in treating the anhydrous alkali salt of stearic acid with benzyl chloride.
18. The process of preparing the benzyl ester of stearic acid which consists in treating the anhydrous alkali salt of stearic acid with benzyl chloride, freeing the resulting product from any excess of benzyl chloride by steam distillation and purifying the benzyl stearate by crystallization from alcohol.

In witness whereof we have hereunto set our hands and seals at Indianapolis, Indiana this 4th day of May, A. D. nineteen hundred and twenty.

HORACE A. SHONLE. [L. S.]
PERRY Q. ROW. [L. S.]